June 23, 1936.　　P. S. WILLIAMS ET AL　　2,044,866
VOLUME MEASURING DEVICE
Filed Sept. 24, 1934
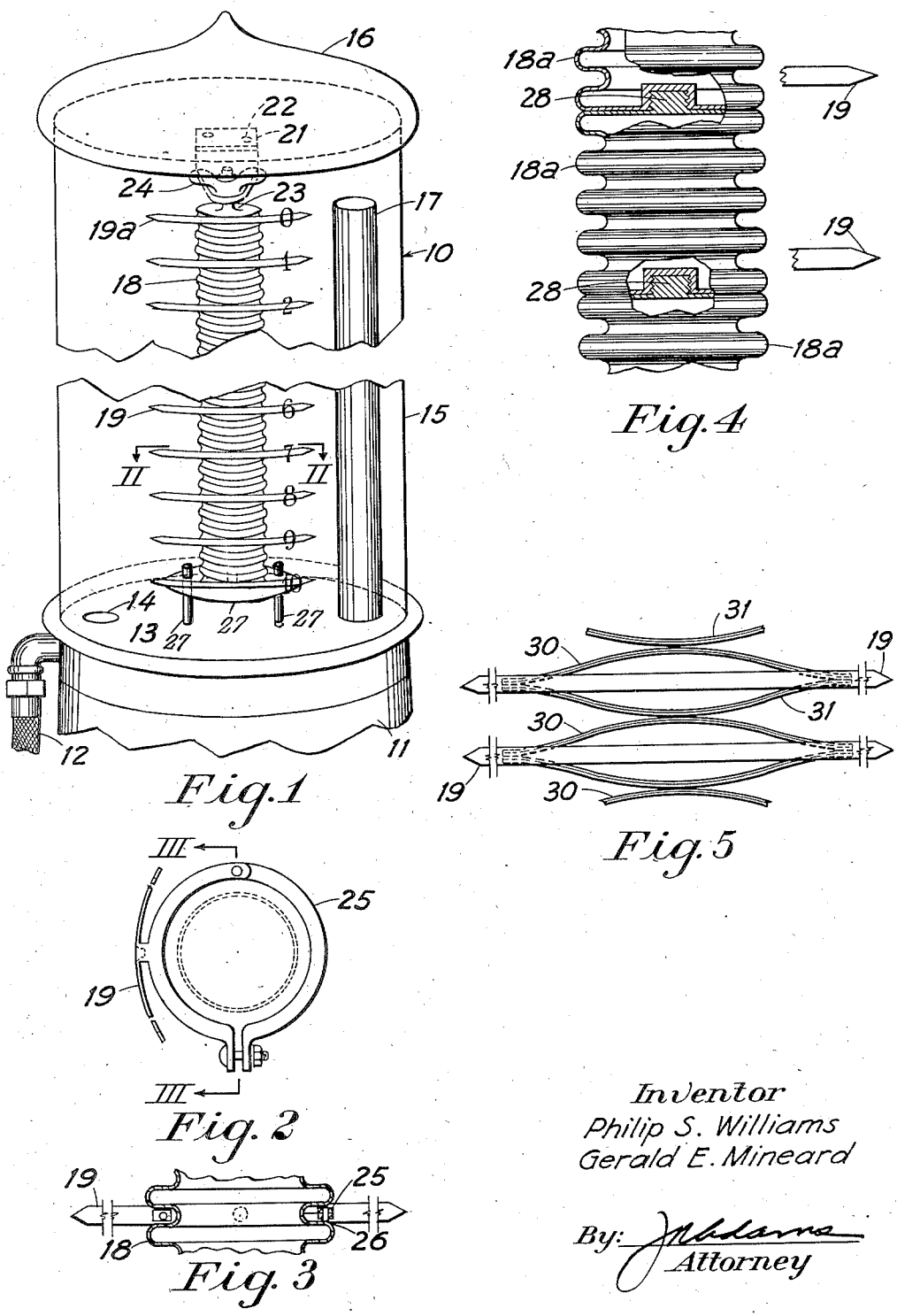
Inventor
Philip S. Williams
Gerald E. Mineard
By: [signature] Attorney Patented June 23, 1936

2,044,866

UNITED STATES PATENT OFFICE 2,044,866

VOLUME MEASURING DEVICE

Philip S. Williams, Richmond, and Gerald E. Mineard, Berkeley, Calif., assignors to Standard Oil Company of California, San Francisco, Calif., a corporation of Delaware Application September 24, 1934, Serial No. 745,206

6 Claims. (Cl. 73—166)

This invention relates to a volume measuring device and more particularly to an improved device adapted to indicate the correct volume of liquid as related to mass.

The volume of most liquids is not an accurate measurement of mass, as it is known that liquid volumes vary with changes in temperature. In the case of dispensing gasoline to the ultimate consumer, the volume method is generally used and no correction is made, taking into account the temperature of the liquid at the time it is measured.

For ordinary ranges of temperature it may be assumed that gasoline expands or contracts .0006 of its volume for each degree of temperature change. For example 10,000 gallons of gasoline at 60° F. would have a volume of 9,994 gallons at 59° F. or 10,006 gallons at 61° F. In other words for each 17° change in temperature above or below 60° F., the volume would be changed about 1%.

A popular type of equipment used in dispensing gasoline by the volume method consists of a transparent container into which the gasoline to be dispensed is pumped. This container is graduated with markers to indicate the volume of gasoline in gallons. These markers are in fixed relation with the container and will dispense a given mass of a particular gasoline at a specified temperature.

It is one object of this invention to provide a measuring device that shall indicate the correct volume of a liquid as related to mass.

Another object is to provide a measuring device that shall be responsive to the temperature of a liquid being measured to automatically indicate the correct volume of such liquid as related to mass.

Another object is to provide a measuring device that shall indicate the correct volume of a liquid as related to mass without resorting to additional weighing means.

Another object is to provide a temperature controlled variable indicating means in combination with a liquid container having a transparent element, the indicating means being located inside the container so that it is directly influenced by the temperature of the liquid being measured.

A further object is to provide a temperature controlled variable indicating means that shall be adaptable for use with and that can be readily and easily installed in transparent containers now in use for dispensing liquids.

A still further object is to provide a device having the above characteristics that shall be simple in structure, durable, positive and accurate in operation, and comparatively cheap to manufacture.

The accomplishments of the above and other objects of the invention will be apparent to those skilled in the art from the following description when taken in connection with the accompanying drawing wherein like reference characters refer to like parts. It is to be expressly understood that the drawing is not a definition of the invention, but merely illustrates certain forms by means of which the invention may be effectuated.

In the drawing:

Figure 1 is a perspective view of a device embodying the invention.

Figure 2 is an enlarged sectional view taken along the line II—II of Figure 1.

Figure 3 is a fragmental sectional view taken along the line III—III of Figure 2.

Figure 4 is a fragmental view partly in elevation and partly in section, illustrating another embodiment of the invention; and Figure 5 is a fragmental view in elevation of still another embodiment of the invention.

With reference to Figures 1 to 3, inclusive, one form of the invention is disclosed in connection with a popular type of liquid dispenser which comprises a container, represented in its entirety, by 10 mounted on a suitable supporting base 11. A conventional drain or dispensing conduit 12 is operably connected with the interior of the container through the container bottom 13 as shown at 14. The body 15 of the container 10 is transparent and usually cylindrical in shape. The container body 15 is closed at its lower end by the bottom 13 and at its upper end by top 16. An over-flow pipe 17 is provided in the container to limit the level that liquid may rise within the container 10.

The embodiment of the present invention, as illustrated in Figures 1 to 3 inclusive, comprises an elongated sylphon bellows 18 having a plurality of spaced indicating parts 19 thereon, the uppermost one of which is fixed or stationary relative to the container, while the others are adjustable or variable with reference to the fixed indicator and to each other. The uppermost or stationary indicator 19a is located at the point or level in the container determined by the over-flow or drain pipe 17. The ends of the indicators 19 may terminate in the form of an arrow, each of the indicators may be positioned on that side of the sylphon nearest the container wall and curved to coincide with the curvature of the container body so as to permit the positioning of the indicators close to the wall of the container whereby correct reading may be made. The upper end of the sylphon 18 is supported from the top 16 by means of a member 21, the upper end of the member 21 being rigidly fixed to the top 16 by any suitable means such as 22 and the lower end of the member 21 is provided with an opening adapted to receive a threaded stud 23 carried by the upper end of the sylphon 18. A wingnut 24 is provided on the threaded stud for adjusting the elevation of the fixed indicator 19a whereby the indicator 19a may be positioned to lie in the same plane as the top of the grain pipe 17. Each of the indicators 19 may be carried by and fixed to the sylphon by a suitable clamping ring 25 (see Figure 2). These clamping rings 25 may be positioned within the corrugations of the sylphon in such a manner as to not interfere with the linear expansion and contraction of the sylphon as shown at 26 in Figure 3.

Suitable guides 27 may be provided on the bottom 13 of the container 10 to extend upwardly through holes in plate 27a for guiding the lower end of the sylphon during the upward and downward movement of the lower end of the sylphon.

The sylphon 18 is adapted to be filled with a liquid having a selected co-efficient of expansion that will cause the sylphon to expand and contract lineally the correct amount. The liquid may be gasoline, octane, nonane, various alcohols, or a blend of such liquids that will modify the linear co-efficient of expansion of the sylphon so that the linear co-efficient of expansion of the assembly will compensate for volumetric expansion of the liquid being measured.

Figure 4 illustrates another embodiment of the invention which consists in a series of superimposed sylphon bellows 18a. These bellows 18a may be operably connected at their adjacent ends by any suitable means such as shown at 28.

Each of these sylphons 18a is also adapted to contain a liquid having a selected co-efficient of expansion and each of the sylphons 18a will operate independently to give correct readings in the case of temperature stratification.

Many modifications are possible, including the embodiment illustrated in Figure 5, which consists of a combination of bi-metallic strips 30 and 31 arranged in super-imposed relation. These strips may be of the same or different temperature co-efficients in order to effect the proper linear expansion and contraction. It will also be noted that in this modification the linear coefficient of each section comprising the members 30 and 31, will operate to give intermediate corrections due to temperature stratification in the case where only partial container delivery is made.

The operation of the device is as follows:

The indicator 19a is adjusted by means of the wingnut 24 to lie in the same plane with the top of the overflow pipe 17. The liquid to be measured is then pumped into the container 10 by any suitable means not shown, at which time the sylphon assembly containing the selected liquid will automatically respond to the temperature of the liquid to be measured to indicate correct volume of such liquid as related to mass.

Some of the important features of the invention are the absence of any movable parts for avoiding wear and obviating errors due to wear, its simplicity of structure as well as its durability, positiveness, and correctness in operation. The device can be readily and easily installed in existing transparent containers and can be manufactured at a comparatively small cost.

While there are only certain embodiments of the invention illustrated and described, it will be apparent to those skilled in the art that certain changes, modifications, substitutions, additions and omissions may be made in the device without departing from the spirit and scope of the invention as defined by the appended claims.

We claim:

1. An apparatus for dispensing liquid comprising a transparent container for liquid, a fixed overflow pipe for limiting the height of liquid in said container, a continuous temperature responsive element independent of said overflow pipe extending substantially throughout the depth of the liquid space in said container, and a scale for indicating the volume of liquid in said container, said scale being adjustable so that the zero may coincide with the top of the overflow pipe, and comprising individual liquid level indicators supported along said temperature responsive element so that the intervals between said indicators will be varied in response to temperature variations in said liquid.

2. An apparatus according to claim 1, with the addition of a removable cover for said container and means for securing said temperature responsive element to said cover, whereby said temperature responsive element and the scale carried thereby may be removed or replaced without disturbing the contents of said container.

3. An apparatus according to claim 1, in which said temperature responsive element comprises a sylphon bellows and a fluid in said sylphon bellows having a selected temperature-pressure characteristic, and said scale indicators each comprise a member adapted to be secured to said sylphon and provided with a liquid level indicator bar.

4. An apparatus according to claim 1, in which said temperature responsive element comprises a sylphon bellows and a temperature responsive fluid in said sylphon bellows, and said scale indicators each comprise a pivoted yoke adapted to be clamped about said sylphon bellows, and a liquid level indicator bar carried by said yoke.

5. An apparatus according to claim 1 in which said scale and said temperature responsive element comprise a plurality of spaced indicator bars connected by bimetallic strips so that the intervals between said bars will be varied in response to temperature variations in said liquid.

6. An apparatus according to claim 1, in which said scale and said temperature responsive element comprise a plurality of spaced indicator bars connected by alternate concave and convex bimetallic elements, so that the intervals between said bars will be varied in response to temperature variations in said liquid.

PHILIP S. WILLIAMS.
GERALD E. MINEARD.